United States Patent [19]

Gasser et al.

[11] 4,073,961
[45] Feb. 14, 1978

[54] BOUILLON BASE

[75] Inventors: Rupert Josef Gasser, Zumikon; Lienhard Bodo Huster, Winterthur, both of Switzerland

[73] Assignee: Societe d'Assistance Technique pour Produits Nestle, S.A., Lausanne, Switzerland

[21] Appl. No.: 714,118

[22] Filed: Aug. 13, 1976

[30] Foreign Application Priority Data

Aug. 26, 1975 Switzerland .................. 11032/75

[51] Int. Cl.$^2$ ..................... A23J 1/18; A23L 1/28
[52] U.S. Cl. ........................... 426/589; 426/656; 426/650
[58] Field of Search ............ 426/7, 62, 533, 589, 426/656, 655, 488, 650; 260/112 R; 195/3, 28 N, 4

[56] References Cited

U.S. PATENT DOCUMENTS

| | | | |
|---|---|---|---|
| 2,407,616 | 9/1946 | Phelps et al. | 426/488 X |
| 3,519,437 | 7/1970 | Giacono | 426/533 |
| 3,914,450 | 10/1975 | Robbins et al. | 426/533 |

*Primary Examiner*—Raymond N. Jones
*Assistant Examiner*—R. A. Yoncoskie
*Attorney, Agent, or Firm*—Watson, Leavenworth, Kelton & Taggart

[57] ABSTRACT

A process for the production of a starting material for the preparation of bouillons from a yeast protein degradation product, which comprises diluting a yeast autolysate with at least the same quantity by weight of water, precipitating substantially insoluble salts, especially alkaline-earth metal phosphates, by heating the diluted autolysate at a pH-value of from 7 to 8.5, separating solid fractions from the treated autolysate by heating so that only a solution is left, treating the residual solution thus obtained by steam distillation, concentrating the treated solution by evaporation to a dry matter content of from 50% to 80% by weight, mixing 0 to 8% of fats, 0 to 5% of a monosaccharide, and 0 to 2% of a nucleotide with the concentrated solution obtained, reacting the mixture obtained by heating at a pH-value of from 5.8 to 6.8 and drying the mixture.

7 Claims, No Drawings

BOUILLON BASE

This invention relates to a process for the production of a starting material for the preparation of bouillons from a yeast protein degradation product.

The use of autolysates or extracts of yeasts in the industrial production of soups, bouillons and condiments is well known. On the other hand, it is also well known that it is extremely difficult completely to free the end products from an after-taste which is indicative of the origin of the starting material. Accordingly, there are already various processes for refining or finishing yeast proteins intended for use in the food industry. Most of these processes are based on the principle of autolysis or on the principle of plasmolysis followed by autolysis, i.e. solubilisation of the proteins and their degradation under the action of natural enzymes of yeasts. One known process recommends for example carrying out autolysis at a neutral rather than acid pH, concentrating the autolysate by evaporation in vacuo and then filtering it by passing it through a gel column. Autolysis at a neutral pH promotes the precipitation of substantially insoluble salts. Substances responsible for the unpleasant taste of yeast are given off during evaporation, whilst substantially insoluble substances, turbidity agents, precipitate and are retained during filtration through the gel column. In another known process, the bitter taste of a yeast autolysate is neutralised by treatment with a relatively fine powder of active carbon. In other known processes, autolysis is followed by washing with alcohol or by decoloration with hydrogen peroxide or even by an addition of non-toxic neutral salts to precipitate the bitter substances.

The present invention is the outcome of a search for a process which would finally enable the after-taste characteristic of the products obtained by conventional processes, however refined they may be, to be completely eliminated.

The present invention relates to a process for the production of a starting material for the preparation of bouillons from a yeast protein degradation product, which comprises diluting a yeast autolysate with at least the same quantity by weight of water, precipitating substantially insoluble salts, especially alkaline-earth metal phosphates, by heating the diluted autolysate at a pH-value of from 7 to 8.5, separating solid fractions from the treated autolysate by heating so that only a solution is left, treating the residual solution thus obtained by steam distillation concentrating the treated solution by evaporation to a dry matter content of from 50% to 80% by weight, mixing 0 to 8% of fats, 0 to 5% of a monosaccharide and 0 to 2% of a nucleotide with the concentrated solution obtained, reacting the mixture obtained by heating at a pH of from 5.8 to 6.8 and drying the mixture.

The product obtained by the process according to the invention is clearly distinguished from known products by its totally neutral flavour and by the complete absence of any after-taste indicative of the origin of the starting material used for its production. It may be used, preferably after grinding, as a starting material for and as the main constituent of edible compositions, such as bouillons in cube or powder form. The taste or specific note of these bouillons may be imparted by incorporating in the composition a small percentage of vegetable or meat extract for example.

A standard commercial-grade yeast autolysate, for example an autolysate of baker's yeast or brewer's yeast, may be used as starting material for carrying out the process according to the invention. In the context of the invention, an autolysate is understood to be a hydrolysate obtained by the action of natural yeast enzymes present in the yeasts and not by the addition of an enzyme or any enzymatic preparation. Autolysates such as these are commercially available under the name of yeast extract in the form of a brown paste with a high dry matter content. This paste may be diluted in water in a ratio of one part by weight of paste to approximately one to four parts by weight, preferably about two parts by weight, of water. The pH of the solution may be adjusted to a value of preferably from about 7 to 8 by the addition of sodium hydroxide for example. The solution may be heated to a temperature of from about 92° C to 98° C and left at that temperature for about 8 to 15 minutes. After cooling to ambient temperature, the solids which have precipitated may be separated, for example by sedimentation, filtration or centrifuging. The residual solution thus obtained may be heated to a temperature of from about 92° C to 98° C before being treated by steam distillation. This treatment may be carried out in counter-current in a column filled with glass elements, such as fragments of tubes, or in a plate column for example. The solution may be introduced at the head of the column whilst the steam may be blown in at the bottom of the column in a ratio of about one part by weight of steam to approximately one to two parts by weight of solution. The solution thus treated may be concentrated in any type of conventional apparatus with one or more effects for example, although it is preferred to use a vacuum evaporator which harms the material being treated as little as possible. Once the required dry matter content has been reached, a few percent of fats, monosaccharide and nucleotide are mixed with the concentrated solution. The fat is used above all as an antifoaming agent. It may be of vegetable or animal origin. It is preferred to use a so-called prime juice, namely beef fat divided and melted at 60° C, of which the melting point is of the order of 30° to 32° C, or a hydrogenated vegetable fat. The monosaccharide is used as flavour precursor. A product of neutral taste is obtained where a hexose, for example glucose, is used. The nucleotide is used as a future strengthener of an aroma which is subsequently imparted during the production of a finished product, the present product belonging to the category of semi-finished products. The nucleotide may be inosine or guanosine monophosphate for example. It is hydrochloric acid which is preferably added to the solution before or after its concentration to reduce its pH to the value required for the reaction of the mixture. The mixture may be reacted at a recommendable pH of from about 6.2 to 6.4 and at a temperature of from 92° C to 98° C over a period ranging from about 10 to 30 minutes for example. An adequate heatable vessel equipped with a stirrer may be used for this purpose. The mixture may then be dried in a single operation in a conventional dryer, or in two operations, namely a second concentration, preferably by evaporation in vacuo, by which it is possible to reach a dry matter content of approximately 80 to 85%, followed by actual drying in a conventional dryer. Drying may be terminated when the mass obtained has a residual moisture content of from about 0.5 to 4%. This mass may then be ground, for example in a hammer mill, to reduce it to a powder.

The process according to the invention is illustrated by the following Examples, in which the percentages quoted represent percent by weight.

EXAMPLE 1

33% of yeast extract are diluted in 66% of water in a double-jacketed stirrer-equipped boiler. The dry matter content of the solution is adjusted to 26%. The pH-value of the solution is adjusted to pH 7. The solution is then heated to a temperature of 95° C and kept at that temperature for 10 minutes. The solution is then cooled to ambient temperature and the solids which have precipitated are separated from it by centrifuging. The residual solution is heated to a temperature of 97° C. The solution thus preheated is passed downwards through a vertical column filled with glass elements in countercurrent to steam ascending through the column at the same throughput by weight. The purified solution obtained is concentrated in a vacuum evaporator to a dry matter content of 60%. The pH-value of the concentrated solution is adjusted to 6.2 by the addition of hydrochloric acid. The concentrated solution is heated to 95° C in a double-jacketed stirrer-equipped tank, and 2% of prime juice, 0.5% of glucose and 0.5% of inosine monophosphate are added to it while stirring. The mixture is kept at 95° C for 20 minutes, after which it is rapidly cooled to ambient temperature. The mixture is concentrated in an evaporator to a dry matter content of 82%. The paste obtained is applied to two metal plates which are introduced into a vacuum drying cabinet where they are left for 6 hours at 65° C, followed by rapid cooling to ambient temperature. The dry mass obtained is immediately ground. A powder with a completely neutral taste is obtained.

EXAMPLE 2

40% of yeast extract and 60% of water are mixed in a double-jacketed boiler. The dry matter content of the solution obtained is adjusted to 32%. The pH-value of the solution is adjusted to 7.5 by the addition of sodium hydroxide. The solution is then heated to a temperature of 95° C and kept at that temperature for 10 minutes. The solution is then cooled to ambient temperature and the solids which have precipitated are separated from it by filtration. The pH-value of the solution is adjusted to pH 7.2. The solution is steam distilled in a plate column in countercurrent in a ratio of one part by weight of solution to 0.8 part by weight of steam. The pH-value of the solution is adjusted to 6.4, after which the solution is concentrated by evaporation in vacuo to a dry matter content of 76%. The paste obtained is heated to 95° C in a heat exchanger equipped with a stirrer. 0.7% of inosine monophosphate, 0.7% of glucose and 2.5% of hydrogenated vegetable fat are then added to the paste with stirring. The paste is then kept at a temperature of 95° C for 20 minutes, after which it is cooled to 30° C and spread over metal plates which are introduced into a vacuum drying cabinet where they are left for 7 hours at 70° C. The mass obtained is ground, giving a powder with a completely neutral taste.

We claim:

1. A process for the production of a starting material for the preparation of bouillons from a yeast protein degradation product, which comprises diluting a yeast autolysate with at least the same quantity by weight of water, precipitating substantially insoluble salts, including alkaline-earth metal phosphates present therein, by heating the diluted autolysate which has a pH-value of from 7 to 8.5 at a temperature sufficient to cause said precipitating, separating solid fractions from the autolysate obtained by said prior heating step so that only a solution is left, subjecting the residual solution thus obtained to a steam stripping operation to purify the product of bitter flavor characteristics, concentrating the treated solution by evaporation to a dry matter content of from 50% to 80% by weight, mixing an effective amount up to 8% fats, an effective amount up to 5% of a monosaccharide, and an effective amount up to 2% of a nucleotide with the concentrated solution obtained, reacting the mixture obtained by heating the mixture having a pH-value of from 5.8 to 6.8 at a temperature sufficient to cause a reaction and drying said reacted mixture.

2. A process as claimed in claim 1, wherein the mixture is reacted by heating for 10 to 30 minutes to a temperature of from 92° C to 98° C.

3. A process as claimed in claim 1, wherein said reaction mixture is dried until its residual moisture content falls to a value of from 0.5% to 4%, and the dry product obtained is ground.

4. A process as claimed in claim 1, wherein the yeast autolysate is diluted with 1.5 to 2 times its weight of water.

5. A process as claimed in claim 1, wherein the diluted autolysate is heated for 8 to 15 minutes to a temperature of from 92° C to 98° C.

6. A process as claimed in claim 1, wherein the residual solution is subjected to a countercurrent flow of steam in the stripping operation in a ratio of 1 part by weight of steam to 1 to 2 parts by weight of solution.

7. A process as claimed in claim 1, wherein the residual solution is heated to a temperature of from 92° C to 98° C before being subjected to steam stripping.

* * * * *

UNITED STATES PATENT AND TRADEMARK OFFICE
CERTIFICATE OF CORRECTION

PATENT NO. : 4,073,961
DATED : February 14, 1978
INVENTOR(S) : Rupert Josef Gasser and Leinhard Bodo Huster It is certified that error appears in the above-identified patent and that said Letters Patent are hereby corrected as shown below:

At Col. 1, line 21, "in vacuo" should read --*in vacuo*--; at Col. 2, line 62, "in vacuo" should read --*in vacuo*--; and at Col. 3, line 50, "in vacuo" should read --*in vacuo*--.

At Col. 4, lines 35-36, (Claim 3), "wherein said reaction" should read --wherein the said reacted--.

Signed and Sealed this

Twenty-eighth Day of November 1978

[SEAL]

Attest:

RUTH C. MASON
*Attesting Officer*

DONALD W. BANNER
*Commissioner of Patents and Trademarks*